(12) United States Patent
Yoshida et al.

(10) Patent No.: US 10,415,467 B2
(45) Date of Patent: Sep. 17, 2019

(54) INTEGRATED GASIFICATION COMBINED CYCLE AND METHOD FOR OPERATING INTEGRATED GASIFICATION COMBINED CYCLE

(71) Applicant: MITSUBISHI HITACHI POWER SYSTEMS, LTD., Yokohama (JP)

(72) Inventors: Naoshige Yoshida, Yokohama (JP); Koichi Sakamoto, Yokohama (JP); Kenichiro Kosaka, Tokyo (JP); Tetsuya Kizu, Yokohama (JP); Yoshinori Koyama, Tokyo (JP); Takashi Fujii, Yokohama (JP); Osamu Shinada, Yokohama (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 297 days.

(21) Appl. No.: 15/320,082

(22) PCT Filed: Jun. 26, 2015

(86) PCT No.: PCT/JP2015/068533
§ 371 (c)(1),
(2) Date: Dec. 19, 2016

(87) PCT Pub. No.: WO2016/024447
PCT Pub. Date: Feb. 18, 2016

(65) Prior Publication Data
US 2017/0138258 A1    May 18, 2017

(30) Foreign Application Priority Data
Aug. 11, 2014 (JP) .................................. 2014-163813

(51) Int. Cl.
*F01K 23/06* (2006.01)
*F01K 23/10* (2006.01)
(Continued)

(52) U.S. Cl.
CPC .................. *F02C 3/28* (2013.01); *C10J 3/46* (2013.01); *C10J 3/466* (2013.01); *C10J 3/48* (2013.01);
(Continued)

(58) Field of Classification Search
CPC ...... F02C 6/18; F02C 3/28; F02C 3/26; F01K 23/10; F01K 23/067
See application file for complete search history.

(56) References Cited

U.S. PATENT DOCUMENTS 4,099,374 A * 7/1978 Foster-Pegg .......... F01K 23/067
60/39.12
4,723,407 A * 2/1988 Goebel ................. F01K 23/068
60/39.12
(Continued)

FOREIGN PATENT DOCUMENTS

EP    1 655 467       5/2006
JP    61-233084       10/1986
(Continued)

OTHER PUBLICATIONS

International Search Report dated Oct. 6, 2015 in corresponding International Application No. PCT/JP2015/068533.
(Continued)

*Primary Examiner* — Steven M Sutherland
*Assistant Examiner* — Eric W Linderman
(74) *Attorney, Agent, or Firm* — Wenderoth, Lind & Ponack, L.L.P.

(57) ABSTRACT

Provided is an integrated coal gasification combined cycle equipped with: a gasifier that generates combustible gas from pulverized coal; a gas cooler; gas turbine equipment; an auxiliary fuel supply unit that supplies an auxiliary fuel to the gas turbine equipment; a heat recovery steam generator; steam turbine equipment; generators; and a circulation line unit that circulates cooling water. The heat recovery
(Continued)

steam generator has a first medium-pressure coal economizer and a second medium-pressure coal economizer. When the combustible gas generated from the pulverized coal is burned, a serial heat exchange line is formed wherein cooling water passes through the first medium-pressure coal economizer, the second medium-pressure coal economizer, and the gas cooler. When the auxiliary fuel is burned, separate heat exchange lines are formed, wherein the cooling water separately passes through the first medium-pressure coal economizer and the second medium-pressure coal economizer.

4 Claims, 5 Drawing Sheets (51) Int. Cl.
    *F02C 3/28*     (2006.01)
    *C10J 3/46*     (2006.01)
    *C10J 3/48*     (2006.01)
    *F02C 3/22*     (2006.01)
    *F02C 6/00*     (2006.01)
    *F02C 6/18*     (2006.01)
    *F22B 1/18*     (2006.01)
    *F01K 13/02*     (2006.01)
    *C10K 1/00*     (2006.01)

(52) U.S. Cl.
    CPC .............. *C10K 1/004* (2013.01); *F01K 13/02* (2013.01); *F01K 23/067* (2013.01); *F01K 23/10* (2013.01); *F02C 3/22* (2013.01); *F02C 6/00* (2013.01); *F02C 6/18* (2013.01); *F22B 1/18* (2013.01); *F22B 1/1815* (2013.01); *C10J 2300/093* (2013.01); *C10J 2300/0906* (2013.01); *C10J 2300/0956* (2013.01); *C10J 2300/0959* (2013.01); *C10J 2300/165* (2013.01); *C10J 2300/1653* (2013.01); *C10J 2300/1675* (2013.01); *C10J 2300/1876* (2013.01); *C10J 2300/1884* (2013.01); *C10J 2300/1892* (2013.01); *F05D 2220/722* (2013.01); *Y02E 20/16* (2013.01); *Y02E 20/18* (2013.01); *Y02E 50/11* (2013.01); *Y02E 50/12* (2013.01); *Y02P 20/129* (2015.11)

(56) References Cited

U.S. PATENT DOCUMENTS

| | | | | |
|---|---|---|---|---|
| 5,251,432 A | * | 10/1993 | Bruckner | F01K 23/067 60/39.182 |
| 5,285,627 A | * | 2/1994 | Losel | F01K 23/067 60/39.12 |
| 6,216,436 B1 | * | 4/2001 | Ranasinghe | F01K 23/068 60/39.12 |
| 9,163,827 B2 | * | 10/2015 | Wilson | C10J 3/721 |

FOREIGN PATENT DOCUMENTS

| | | |
|---|---|---|
| JP | 11-100584 | 4/1999 |
| JP | 2001-173411 | 6/2001 |
| JP | 2009-197693 | 9/2009 |
| JP | 2013-249745 | 12/2013 |

OTHER PUBLICATIONS

Written Opinion of the International Searching Authority dated Oct. 6, 2015 in corresponding International Application No. PCT/JP2015/068533.

* cited by examiner

INTEGRATED GASIFICATION COMBINED CYCLE AND METHOD FOR OPERATING INTEGRATED GASIFICATION COMBINED CYCLE

TECHNICAL FIELD

The present invention relates to an integrated gasification combined cycle and a method for operating the integrated gasification combined cycle.

BACKGROUND ART

Integrated gasification combined cycles generate electric power, for example, with a driving force of a gas turbine that combusts a combustible gas generated by gasifying carbonaceous feedstocks, such as coal and biomass, and a driving force of a steam turbine obtained by recovering exhaust heat of the gas turbine. A representative includes an integrated coal gasification combined cycle (IGCC) using coal (for example, refer to PTL 1).

Generally, integrated gasification combined cycles are configured to include a carbonaceous feedstock supply device, a gasifier, a char recovery unit, a gas purification unit, gas turbine equipment, steam turbine equipment, and a heat recovery steam generator. In the gasifier, a carbonaceous feedstock is gasified by a gasification reaction and a combustible gas is generated. The combustible gas generated by the gasifier is purified by the gas purification unit after an unreacted portion (char) of the carbonaceous feedstock is removed in the char recovery unit, and is supplied to the gas turbine equipment.

The gas turbine equipment combusts the combustible gas with a combustor to generate a high-temperature/high-pressure flue gas to drive the gas turbine. The heat recovery steam generator recovers heat from the flue gas after driving the gas turbine, and generates steam. The steam turbine equipment drives the steam turbine with the steam generated by the heat recovery steam generator.

The related-art integrated gasification combined cycles include a gas cooler (syngas cooler) that generates steam from cooling water by heat exchange between the combustible gas generated by the gasifier and the cooling water. The cooling water subjected to heat exchange with the flue gas in a coal economizer of the heat recovery steam generator is supplied to the gas cooler. Additionally, the steam generated by the gas cooler is supplied to the steam turbine equipment after being supplied to the heat recovery steam generator and is furthermore turned into high-temperature/high-pressure steam. In this way, in the related-art integrated gasification combined cycles, the cooling water and the steam are circulated between the heat recovery steam generator, the gas cooler, and the steam turbine equipment.

CITATION LIST

Patent Literature

[PTL 1] Japanese Unexamined Patent Application Publication No. 2009-197693

SUMMARY OF INVENTION

Technical Problem

In the integrated gasification combined cycle disclosed in PTL 1, in a case where the gasifier is stopped for a long period of time due to factors, such as an abnormality or maintenance of the gasifier, combustion using an auxiliary fuel is performed in the gas turbine equipment, and combined cycle power generation is continued. In this case, since combustible gas is not generated by the gasifier and steam is not generated by the gas cooler, the amount of steam that passes through the heat recovery steam generator becomes markedly less than a design flow rate, and the temperature of the steam rises excessively.

Therefore, in PTL 1, in a case where the combustion using the auxiliary fuel is performed in the gas turbine equipment and the combined cycle power generation is continued, the steam that passes through a heat recovery steam generator is made to bypass at least one of a plurality of superheaters such that the temperature of the steam does not rise excessively.

However, in PTL 1, when performing the combined cycle power generation using the auxiliary fuel, the amount of steam that passes through the heat recovery steam generator becomes markedly less than the design flow rate, and the recovery efficiency of heat from the flue gas decreases markedly. Additionally, in PTL 1, the steam that passes through the heat recovery steam generator is made to bypass at least one of the plurality of superheaters such that the temperature of the steam does not rise excessively. Therefore, the recovery efficiency of heat from the flue gas by the heat recovery steam generator further decreases.

The invention has been made in order to solve the above problems, and an object thereof is to provide an integrated gasification combined cycle and a method for operating the same that, even in a case where a gasifier or a gas purification unit has stopped for a long period of time due to a malfunction or other factors, can combust another auxiliary fuel, which becomes an alternative for a combustible gas generated by a gasifier, in gas turbine equipment to generate flue gas, and can maintain the recovery efficiency of heat from the flue gas with a heat recovery steam generator.

Solution to Problem

The invention has adopted the following means in order to solve the above problems.

An integrated gasification combined cycle related to one aspect of the invention includes a gasifier that performs a gasification reaction of a carbonaceous feedstock using an oxygen-containing gas, and generates a combustible gas; a gas cooler that generates steam from cooling water by heat exchange between the combustible gas generated by the gasifier, and the cooling water; gas turbine equipment that combusts the combustible gas cooled by the gas cooler or an auxiliary fuel supplied from an auxiliary fuel supply unit, and obtains rotational driving power; a heat recovery steam generator that recovers the quantity of heat of flue gas discharged from the gas turbine equipment, and generates steam; steam turbine equipment that obtains rotational driving power with the steam supplied from the heat recovery steam generator; a generator that is driven by the rotational driving power supplied by the gas turbine equipment and the steam turbine equipment; and a circulation line unit that performs heat exchange of the cooling water in the heat recovery steam generator. The heat recovery steam generator includes a first heat exchanger and a second heat exchanger that perform heat exchange between the flue gas and the cooling water. The circulation line unit performs switching regarding whether the cooling water passes through any of the first heat exchanger, the second heat exchanger, and the gas cooler, according to a case where the gas turbine equipment combusts the combustible gas and a case where the gas turbine equipment combusts the auxiliary fuel.

In the coal integrated gasification combined cycle of the one aspect of the invention, in a case where the combustible gas is generated by the gasifier, the combustible gas cooled by the gas cooler is combusted by the gas turbine equipment, is turned into the flue gas, and is guided to the heat recovery steam generator. In this case, the gas cooler recovers heat from the combustible gas and generates steam, and supply water that balances with the amount of the generated steam is supplied to the gas cooler through the first heat exchanger (first medium-pressure coal economizer) and the second heat exchanger (second medium-pressure coal economizer) of the heat recovery steam generator. Since the flue gas, the first heat exchanger (first medium-pressure coal economizer), and the second heat exchanger (second medium-pressure coal economizer) perform sufficient heat exchange, the temperature of the flue gas at an outlet of the heat recovery steam generator falls, and the quantity of heat of the flue gas is sufficiently recovered.

Meanwhile, in a case where the combustible gas is not generated by the gasifier, the auxiliary fuel is supplied from the auxiliary fuel supply unit to the gas turbine equipment, is turned into the flue gas, and is guided to the heat recovery steam generator. In this case, since there is no heat recovery using the gas cooler, water supply is not performed, the amount of water supply that passes through the second heat exchanger (second medium-pressure coal economizer) of the heat recovery steam generator becomes small, and the temperature of the flue gas cannot be sufficiently lowered.

Thus, in the integrated gasification combined cycle related to the one aspect of the invention, the circulation line unit performs switching regarding whether the cooling water passes through any of the first heat exchanger, the second heat exchanger, and the gas cooler, according to a case where the gas turbine equipment combusts the combustible gas and a case where the gas turbine equipment combusts the auxiliary fuel.

If so, switching to a heat exchanger through which the cooling water passes can be appropriately be performed, according to a case where the gas turbine equipment combusts the combustible gas and a case where the gas turbine equipment combusts the auxiliary fuel, and the temperature of the flue gas can be sufficiently lowered.

In the integrated gasification combined cycle related to the one aspect of the invention, the circulation line unit may form a serial heat exchange line in which the cooling water serially passes through the first heat exchanger, the second heat exchanger, and the gas cooler in a case where the gas turbine equipment combusts the combustible gas, and form separate heat exchange lines in which the cooling water does not pass through the gas cooler but separately passes through the first heat exchanger and the second heat exchanger, in a case where the gas turbine equipment combusts the auxiliary fuel, and the flue gas may be discharged in a predetermined flue gas temperature range from the heat recovery steam generator.

According to this configuration, in a case where the gas turbine equipment combusts the auxiliary fuel, the separate heat exchange lines in which the cooling water does not pass through the gas cooler but respectively and separately passes through the first heat exchanger and the second heat exchanger are formed.

If so, the recovery efficiency of heat from the flue gas by the heat recovery steam generator can be increased compared with a case where the serial heat exchange line is formed by the first heat exchanger and the second heat exchanger.

Consequently, even in a case where the auxiliary fuel that becomes an alternative for the combustible gas generated by the gasifier is combusted in the gas turbine equipment to generate the flue gas, an integrated gasification combined cycle that can maintain the recovery efficiency of heat from the flue gas by the heat recovery steam generator can be provided.

In the integrated gasification combined cycle of the above configuration, the separate heat exchange lines formed in a case where the gas turbine equipment combusts the auxiliary fuel may include a first heat exchange line that allows the cooling water to be circulated through the first heat exchanger, and a second heat exchange line that allows the cooling water to be circulated through the second heat exchanger, the first heat exchange line may include a steam separator to which the cooling water subjected to heat exchange by the first heat exchanger is guided and which supplies the steam separated from the cooling water to the steam turbine equipment, and the circulation line unit may include a regulating valve that regulates the inflow rate of the cooling water from the second heat exchange line to the first heat exchange line according to the amount of supply of the steam from the steam separator to the steam turbine equipment.

According to such an integrated gasification combined cycle, the steam separator of the first heat exchange line formed in a case where the gas turbine equipment combusts the auxiliary fuel separates steam from the cooling water subjected to heat exchange by the first heat exchanger, which is then supplied to the steam turbine equipment. Then, the inflow rate of the cooling water from the second heat exchange line to the first heat exchange line is regulated by the regulating valve according to the amount of supply of the steam from the steam separator to the steam turbine equipment. Therefore, the flow rate of the cooling water that flows through the first heat exchange line is appropriately maintained.

In a method for operating an integrated gasification combined cycle related to the one aspect of the invention, the integrated gasification combined cycle includes a gasifier that performs a gasification reaction of a carbonaceous feedstock using an oxygen-containing gas, and generates a combustible gas; a gas cooler that generates steam from cooling water by heat exchange between the combustible gas generated by the gasifier, and the cooling water; gas turbine equipment that combusts the combustible gas cooled by the gas cooler or an auxiliary fuel supplied from an auxiliary fuel supply unit, and obtains rotational driving power; a heat recovery steam generator that recovers the quantity of heat of the flue gas discharged from the gas turbine equipment, and generates steam; steam turbine equipment that obtains rotational driving power with the steam supplied from the heat recovery steam generator; and a generator that is driven by the rotational driving power supplied by the gas turbine equipment and the steam turbine equipment. The heat recovery steam generator includes a first heat exchanger that performs heat exchange between the flue gas and the cooling water, and a second heat exchanger that performs heat exchange between the flue gas and the cooling water. The method includes a step of performing switching regarding whether the cooling water passes through any of the first heat exchanger, the second heat exchanger, and the gas cooler, according to a case where the gas turbine equipment combusts the combustible gas and a case where the gas turbine equipment combusts the auxiliary fuel.

In the method for operating the coal integrated gasification combined cycle of the one aspect of the invention, in a case where the combustible gas is generated by the gasifier, the combustible gas cooled by the gas cooler is combusted by the gas turbine equipment, is turned into the flue gas, and is guided to the heat recovery steam generator. In this case, the gas cooler recovers heat from the combustible gas and generates steam, and supply water that balances with the amount of the generated steam is supplied to the gas cooler through the first heat exchanger (first medium-pressure coal economizer) and the second heat exchanger (second medium-pressure coal economizer) of the heat recovery steam generator. Since the flue gas, the first heat exchanger (first medium-pressure coal economizer), and the second heat exchanger (second medium-pressure coal economizer) perform sufficient heat exchange, the temperature of flue gas at an outlet of the heat recovery steam generator falls, and the quantity of heat of flue gas is sufficiently recovered.

Meanwhile, in a case where the combustible gas is not generated by the gasifier, the auxiliary fuel is supplied from the auxiliary fuel supply unit to the gas turbine equipment, is turned into the flue gas, and is guided to the heat recovery steam generator. In this case, since there is no heat recovery using the gas cooler, water supply is not performed, the amount of water supply that passes through the second heat exchanger (second medium-pressure coal economizer) of the heat recovery steam generator becomes small, and the temperature of flue gas cannot be sufficiently lowered.

Thus, in the method for operating an integrated gasification combined cycle related to the one aspect of the invention, the circulation line unit performs switching regarding whether the cooling water passes through any of the first heat exchanger, the second heat exchanger, and the gas cooler, according to a case where the gas turbine equipment combusts the combustible gas and a case where the gas turbine equipment combusts the auxiliary fuel.

If so, switching to a heat exchanger through which the cooling water passes can be appropriately performed, according to a case where the gas turbine equipment combusts the combustible gas and a case where the gas turbine equipment combusts the auxiliary fuel, and the temperature of the exhaust gas can be sufficiently lowered.

In the method for operating an integrated gasification combined cycle, related to the one aspect of the invention, in the switching step, a serial heat exchange line may be formed in which the cooling water serially passes through the first heat exchanger, the second heat exchanger, and the gas cooler in a case where the gas turbine equipment combusts the combustible gas, and separate heat exchange lines may be formed in which the cooling water does not pass through the gas cooler but separately passes through the first heat exchanger and the second heat exchanger, in a case where the gas turbine equipment combusts the auxiliary fuel, and the flue gas may be discharged in a predetermined flue gas temperature range from the heat recovery steam generator.

According to this configuration, in a case where the gas turbine equipment combusts the auxiliary fuel, the separate heat exchange lines in which the cooling water does not pass through the gas cooler but respectively and separately passes through the first heat exchanger and the second heat exchanger are formed.

If so, the recovery efficiency of heat from the flue gas by the heat recovery steam generator can be increased compared with a case where the serial heat exchange line is formed by the first heat exchanger and the second heat exchanger. Consequently, even in a case where the auxiliary fuel that becomes an alternative for the combustible gas generated by the gasifier is combusted in the gas turbine equipment to generate the flue gas, the method for operating an integrated gasification combined cycle that can maintain the recovery efficiency of heat from the flue gas by the heat recovery steam generator can be provided.

In the method for operating an integrated gasification combined cycle of the above configuration, the separate heat exchange lines may include a first heat exchange line that allows the cooling water to be circulated through the first heat exchanger, and a second heat exchange line that allows the cooling water to be circulated through the second heat exchanger, the first heat exchange line may include a steam separator to which the cooling water subjected to heat exchange by the first heat exchanger is guided and which supplies the steam separated from the cooling water to the steam turbine equipment, and a regulating step may be further provided to regulate the inflow rate of the cooling water from the second heat exchange line to the first heat exchange line according to the amount of supply of the steam from the steam separator to the steam turbine equipment.

According to such a method for operating an integrated gasification combined cycle, the steam separator of the first heat exchange line formed in a case where the gas turbine equipment combusts the auxiliary fuel separates steam from the cooling water subjected to heat exchange by the first heat exchanger, and supplies the steam to the steam turbine equipment. Then, the inflow rate of the cooling water from the second heat exchange line to the first heat exchange line is regulated by the regulating valve according to the amount of supply of the steam from the steam separator to the steam turbine equipment. Therefore, the flow rate of the cooling water that flows through the first heat exchange line is appropriately maintained.

Advantageous Effects of Invention

According to the invention, it is possible to provide an integrated gasification combined cycle and a method for operating the same that, even in a case where a gasifier or a gas purification unit has stopped for a long period of time due to a malfunction or other factors, can combust an auxiliary fuel, which becomes an alternative for a combustible gas generated by a gasifier, in gas turbine equipment to generate a flue gas, and can maintain the recovery efficiency of heat from the flue gas with a heat recovery steam generator.

DESCRIPTION OF EMBODIMENTS

Hereinafter, an integrated coal gasification combined cycle of an embodiment of the invention will be described with reference to the drawings.

Figure 1:
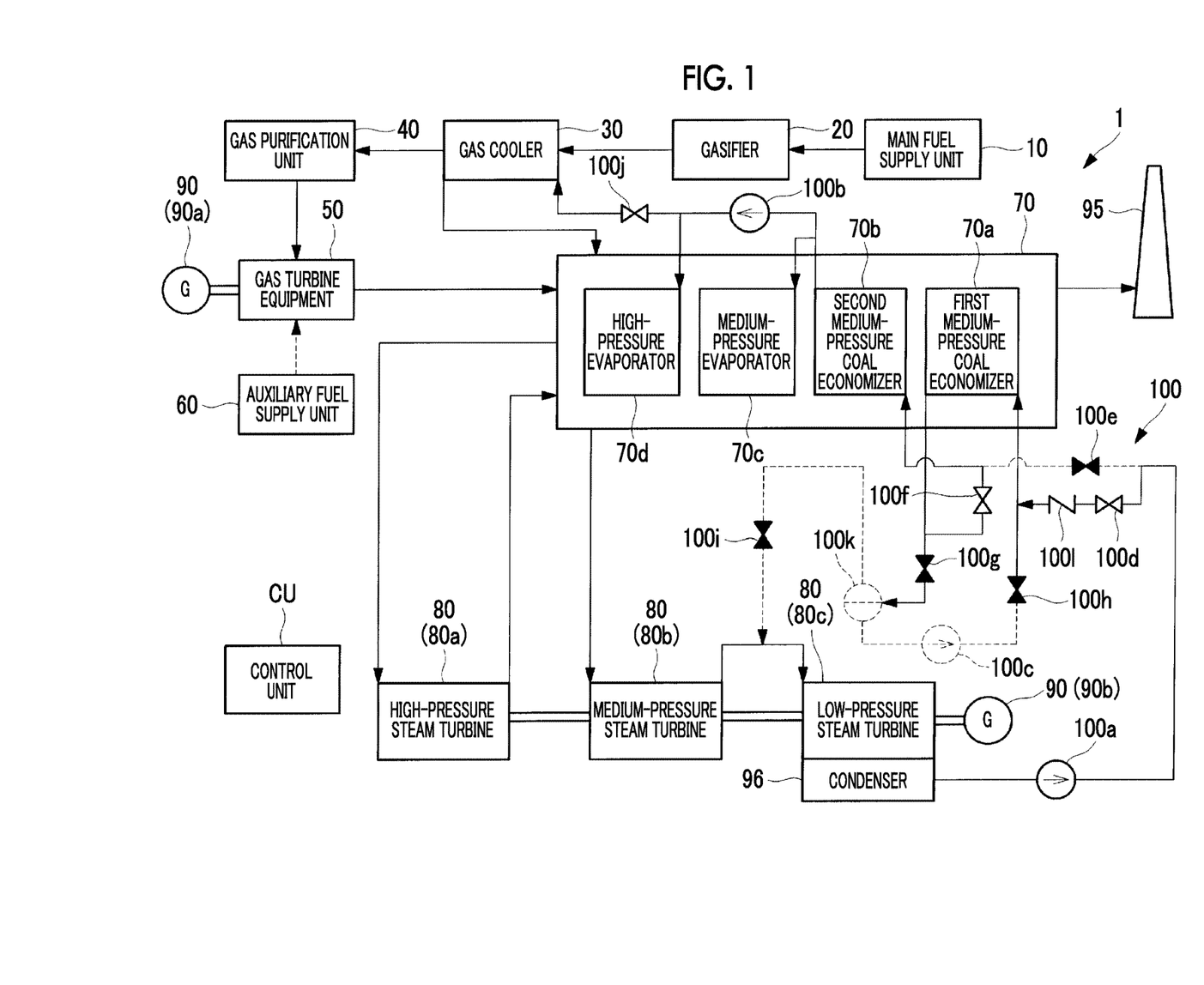
FIG. 1 is a system diagram illustrating the integrated coal gasification combined cycle of an embodiment of the invention, and is a view illustrating a state where a combustible gas generated by a gasifier is combusted.
Figure 2:
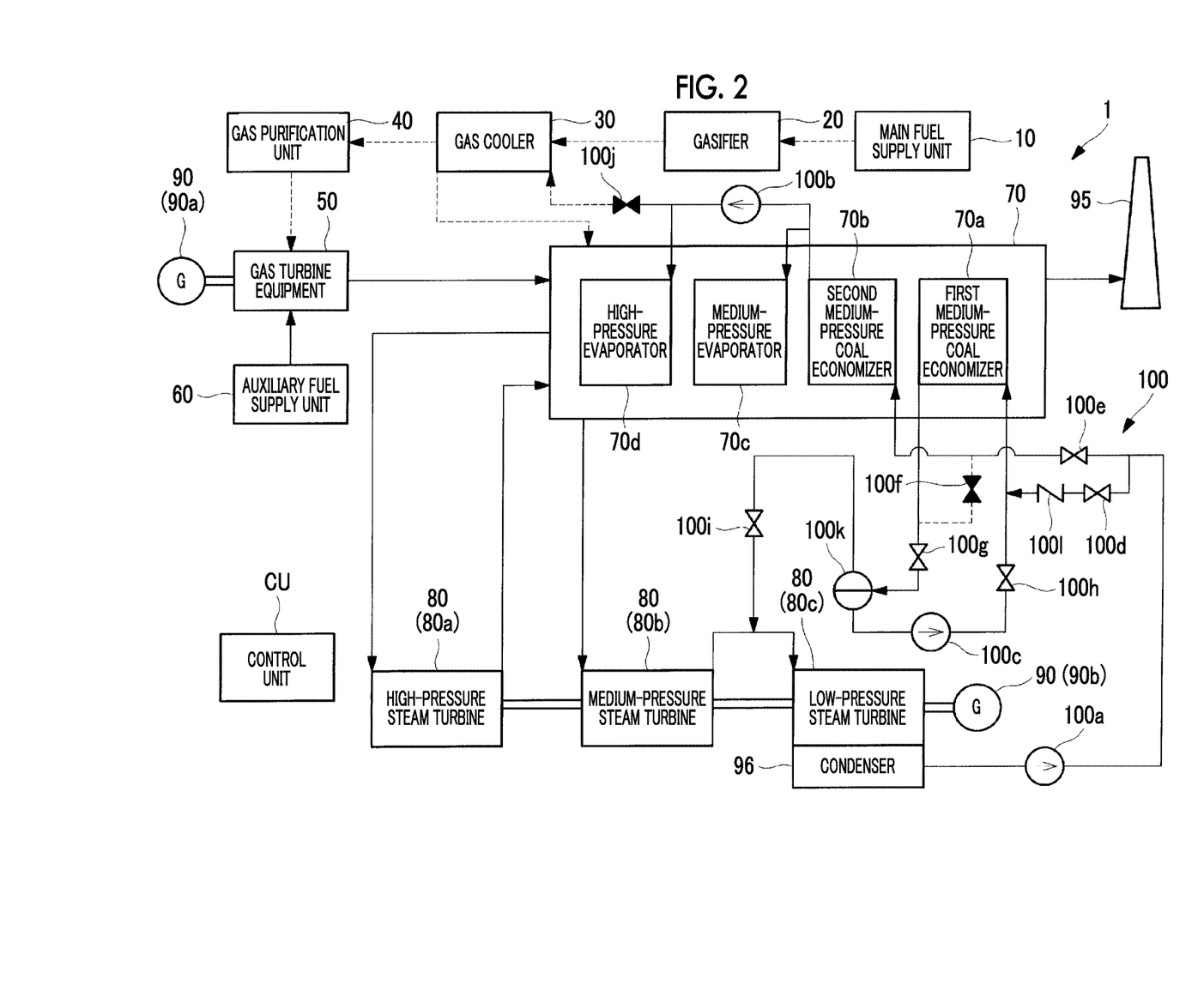
FIG. 2 is a system diagram illustrating the integrated coal gasification combined cycle of the embodiment of the invention, and is a view illustrating a state where an auxiliary fuel is combusted.

As illustrated in FIGS. 1 and 2, the integrated coal gasification combined cycle (IGCC) 1 of the present embodiment includes a main fuel supply unit 10, a gasifier 20, a gas cooler 30, a gas purification unit 40, gas turbine equipment 50, an auxiliary fuel supply unit (gas supply unit) 60, a heat recovery steam generator 70, steam turbine equipment 80, a generator 90, a circulation line unit 100, and a control unit CU.

The main fuel supply unit 10 is a device that pulverizes coal, which is a carbonaceous feedstock, using a coal mill (not illustrated), generates pulverized coal, and supplied the generated coal to the gasifier 20. The pulverized coal generated by the main fuel supply unit 10 is supplied to the gasifier 20 by being conveyed by nitrogen gas supplied from an air separation unit (not illustrated).

The gasifier 20 is a device that performs a gasification reaction on the pulverized coal supplied from the main fuel supply unit 10 with a gasifying agent that is an oxygen-containing gas, gasifies the pulverized coal, and generates a combustible gas. For example, a furnace of a type called an air-blown two-stage entrained bed gasifier is adopted as the gasifier 20. The gasifier 20 supplies the generated combustible gas to the gas cooler 30. The gasifier 20 constitutes gasifier equipment together with the gas cooler 30.

As the oxygen-containing gas, air including oxygen or oxygen gas generated in the air separation unit (not illustrated) are used.

The gas cooler 30 is a heat exchanger that generates steam from cooling water by heat exchange between the combustible gas supplied from the gasifier 20, and the cooling water. The gas cooler 30 generates steam by the heat exchange between the cooling water supplied from a second medium-pressure coal economizer 70b of the heat recovery steam generator 70, and the combustible gas, and supplies the generated steam to a high-pressure steam turbine 80a.

The combustible gas from which heat has been recovered in the gas cooler 30 is guided to the gas purification unit 40 after char is recovered by a char recovery unit (not illustrated).

The gas purification unit 40 is a unit that purifies the combustible gas from which char has been separated and removed by the char recovery unit, thereby removing impurities, such as a sulfur component, and purifies gas with properties suitable as fuel gas for the gas turbine equipment 50. The combustible gas purified by the gas purification unit 40 is supplied to a combustor (not illustrated) of the gas turbine equipment 50.

The gas turbine equipment 50 includes the combustor (not illustrated), a compressor (not illustrated), and a gas turbine (not illustrated). The combustor combusts the combustible gas supplied from the gas purification unit 40, using compressed air compressed by the compressor. If the combustible gas is combusted in this way, high-temperature/high-pressure flue gas is generated, and is supplied from the combustor to the gas turbine. As a result, the high-temperature/high-pressure flue gas works to drive the gas turbine, and high-temperature flue gas is discharged. The rotating shaft output of the gas turbine is used as a driving source of a generator 90a or the compressor.

The auxiliary fuel supply unit (gas supply unit) 60 is a device that supplies an auxiliary fuel, which is a combustible gas, to the gas turbine equipment 50, in a case where the pulverized coal is not supplied from the main fuel supply unit 10 to the gasifier 20 and the combustible gas is not generated by the gasifier 20. The control unit CU controls the auxiliary fuel supply unit 60 so as to supply an auxiliary fuel from the auxiliary fuel supply unit 60, in a case where the pulverized coal is not supplied from the main fuel supply unit 10 to the gasifier 20.

As the auxiliary fuel, for example, hydrocarbon gas, such as natural gas, can be used. In addition, various kinds of a combustible gas can be used besides the hydrocarbon gas.

The heat recovery steam generator 70 is equipment that recovers heat held by the high-temperature flue gas discharged from the gas turbine equipment 50, and generates steam. The heat recovery steam generator 70 generates steam by the heat exchange between the flue gas and water, and supplies the generated steam to the steam turbine equipment 80. The heat recovery steam generator releases the flue gas, of which the temperature has dropped due to the heat exchange with water, from a stack to the ambient air after required treatment is performed.

The heat recovery steam generator 70 includes a plurality of heat exchangers for exchanging heat with the high-temperature flue gas discharged from the gas turbine equipment 50, and cooling water or steam. The plurality of heat exchangers are disposed in order of a first medium-pressure coal economizer 70a, the second medium-pressure coal economizer 70b, a medium-pressure evaporator 70c, and a high-pressure evaporator 70d from a downstream side toward an upstream side in a flow direction of the flue gas.

The steam turbine equipment 80 is equipment that is operated using the steam supplied from the heat recovery steam generator 70 as a driving source, and rotates a rotating shaft coupled to a generator 90b. The generator 90b generates electric power using rotational driving power resulting from the rotation of the rotating shaft. The steam turbine equipment 80 includes a high-pressure steam turbine 80a, a medium-pressure steam turbine 80b, and a low-pressure steam turbine 80c.

The circulation line unit 100 is a line consisting of various devices that circulate cooling water and steam evaporated from the cooling water between the gas cooler 30, the heat recovery steam generator 70, and the steam turbine equipment 80, and flow passages that connect these devices together.

The circulation line unit 100 includes a medium-pressure water supply pump 100a, a high-pressure water supply pump 100b, a circulation pump 100c, a regulating valve 100d, and switching valves 100e, 100f, 100g, 100h, 100i, and 100j. Additionally, the circulation line unit 100 includes a steam separator 100k and a check valve 100l.

The medium-pressure water supply pump 100a is a pump that supplies cooling water stored in a condenser 96 that cools low-pressure steam that has worked in the low-pressure steam turbine 80c. The high-pressure water supply pump 100b is a pump that supplies the cooling water, which is discharged from the second medium-pressure coal economizer 70b, to the medium-pressure evaporator 70c, the high-pressure evaporator 70d, and the gas cooler 30.

The circulation pump 100c is a pump that feeds the cooling water, from which steam has been separated in the steam separator 100k, to the first medium-pressure coal economizer 70a.

The steam separator 100k is a device that separates cooling water, which is heated in the first medium-pressure coal economizer 70a and is decompressed by the switching valve 100g, into steam and drain water. The steam separated by the steam separator 100k is supplied to the low-pressure steam turbine 80c. Meanwhile, the drain water separated by the steam separator 100k is supplied to the first medium-pressure coal economizer 70a.

The regulating valve 100d is a valve for supplying cooling water with an amount equivalent to the steam separated by the steam separator 100k, to a circulation line that allows the cooling water to be circulated through the first medium-pressure coal economizer 70a.

The check valve 100l is a valve that is provided on the downstream side of the regulating valve 100d to prevent cooling water from flowing back to the regulating valve 100d.

The switching valves 100e, 100f, 100g, 100h, 100i, and 100j are switching valves that are provided on flow passages constituting the circulation line unit 100, and are able to switch an opened/closed state, thereby forming a plurality of heat exchange lines in which the first medium-pressure coal economizer 70a, the second medium-pressure coal economizer 70b, and the gas cooler 30 are related to the circulation line unit 100.

The control unit (controller) CU is a device that controls respective parts of the integrated coal gasification combined cycle 1. The control unit CU executes various kinds of control operation by reading and executing a control program from a storage unit (not illustrated) in which the control program for executing the control operation is stored.

Hereinafter, the processing to be executed by the control unit CU will be described using a flowchart of FIG. 3.

Figure 3:
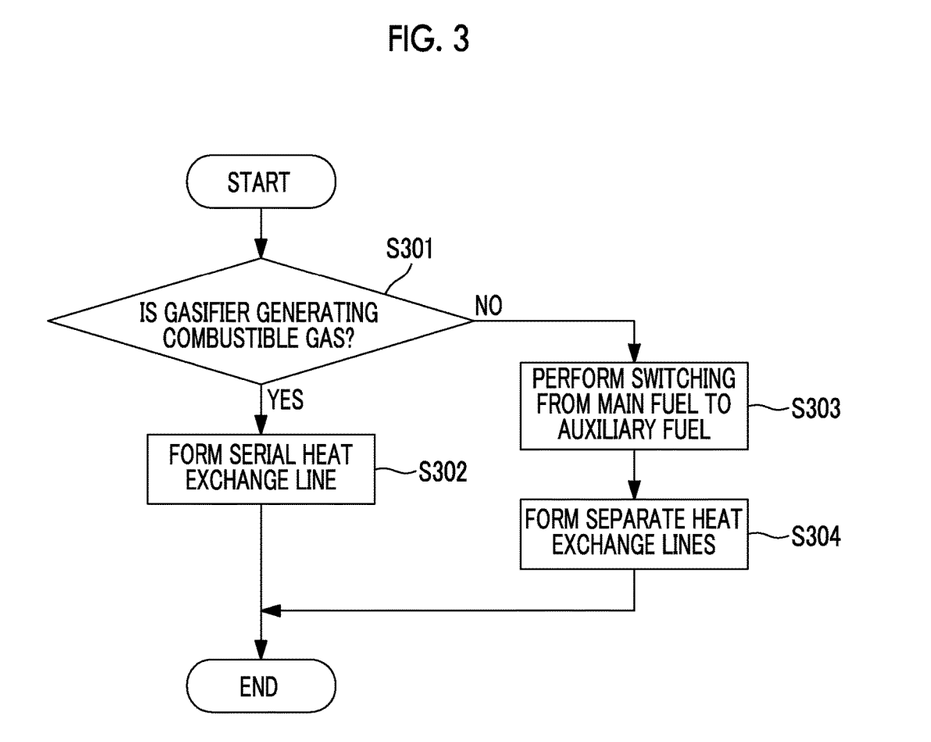
FIG. 3 is a flowchart illustrating the operation of the integrated coal gasification combined cycle of the embodiment of the invention.

By executing operation illustrated in the flowchart of FIG. 3, the control unit CU forms a heat exchange line for cooling water according to whether or not generation of the combustible gas by the gasifier 20 is performed, and maintains the recovery efficiency of heat from flue gas.

In Step S301, the control unit CU determines whether or not the gasifier 20 is generating the combustible gas. If the answer is YES, the processing proceeds to Step S302, and if the answer is NO, the processing proceeds to Step S303.

The control unit CU determines the answer to be YES in a case where the pulverized coal that is the main fuel is supplied from the main fuel supply unit 10 to the gasifier 20. Meanwhile, the control unit CU determines the answer to be NO in a case where supply of the pulverized coal from the main fuel supply unit 10 to the gasifier 20 has stopped due to abnormality or the like.

In Step S302 (first heat exchange step), the control unit CU controls the opened/closed state of the switching valves 100e, 100f, 100g, 100h, and 100i and the regulating valve 100d so as to form a serial heat exchange line with the first medium-pressure coal economizer 70a, the second medium-pressure coal economizer 70b, and the gas cooler 30.

The control unit CU performs control so as to bring the switching valves 100e, 100g, 100h, and 100i into a closed state (black valves in FIG. 1) and to bring the switching valve 100f and the regulating valve 100d into an open state (white valves in FIG. 1).

Here, switching of the opened/closed state of the switching valve 100j is controlled by the water level of a drum (not illustrated) installed within the gas cooler 30. If the cooling water within the drum evaporates due to heat exchange with the combustible gas to be supplied from the gasifier 20 to the gas cooler 30 and water level falls, the switching valve 100j is brought into an open state in order to maintain the water level. Since the water level does not fall if the combustible gas supplied from the gasifier 20 decreases, the switching valve 100j maintains a close state.

Here, although the switching of the opened/closed state of the switching valve 100j has been described, switching of the other switching valves 100e, 100f, 100g, 100h, and 100i is performed, for example, when the control unit CU controls driving mechanisms built in the other switching valves and drives valve bodies. Moreover, for example, in a case where the driving mechanisms are not built in the other switching valves, the switching of the opened/closed state of the other switching valves is performed by displaying instructions on whether the control unit CU should bring the other switching valves into an open state or into a closed state on a display device (not illustrated). In the latter case, a worker manually switches the opened/closed state of the other switching valves according to the instructions of the display device.

Here, the serial heat exchange line formed by the operation of Step S302 will be described with reference to FIG. 1.

In FIG. 1, the cooling water to be pumped by the medium-pressure water supply pump 100a is guided to the first medium-pressure coal economizer 70a via the regulating valve 100d and the check valve 100l. After the cooling water guided to the first medium-pressure coal economizer 70a is heated by the heat exchange with the flue gas, the cooling water is guided to the second medium-pressure coal economizer 70b via the switching valve 100f.

After the cooling water guided to the second medium-pressure coal economizer 70b is heated by the heat exchange with the flue gas, a portion thereof is guided to the high-pressure water supply pump 100b and another portion thereof is guided to the medium-pressure evaporator 70c. The cooling water guided to the medium-pressure evaporator 70c is heated by the heat exchange with the flue gas, is turned into the steam, and is guided to the medium-pressure steam turbine 80b.

A portion of the cooling water guided to the high-pressure water supply pump 100b is guided to the gas cooler 30 via the switching valve 100j, and another portion thereof is guided to the high-pressure evaporator 70d. The cooling water guided to the high-pressure evaporator 70d is heated by the heat exchange with the flue gas, is turned into the steam, and is guided to the high-pressure steam turbine 80a. The cooling water guided to the gas cooler 30 is heated by the heat exchange with the combustible gas generated by the gasifier 20, is turned into the steam. As a result, the steam is guided to the heat recovery steam generator 70 and heated by the heat exchanger (not illustrated), and is then guided to the high-pressure steam turbine 80a.

The steam guided to the high-pressure steam turbine 80a is used as rotational driving power in the high-pressure steam turbine 80a. After the steam that has worked in the high-pressure steam turbine 80a and has fallen in temperature is reheated within the heat recovery steam generator 70, the steam is guided to the medium-pressure steam turbine 80b, and is used as rotational driving power in the medium-pressure steam turbine 80b.

The steam that has worked in the medium-pressure steam turbine 80b and has fallen in temperature is guided to the low-pressure steam turbine 80c, and is used as rotational driving power. The steam that has worked in the low-pressure steam turbine 80c and has fallen in temperature is cooled and liquefied by the condenser 96, and is stored in a storage part (not illustrated) of the condenser 96. The water stored in the storage part of the condenser 96 is again guided to the high-pressure water supply pump 100b as cooling water.

As described above, in a case where the gasifier 20 is generating the combustible gas, the control unit CU forms the serial heat exchange line with the first medium-pressure coal economizer 70a, the second medium-pressure coal economizer 70b, and the gas cooler 30. Since heat exchange using the first medium-pressure coal economizer 70a, the second medium-pressure coal economizer 70b, and the gas cooler 30 is performed in this serial heat exchange line, the flow rate of the cooling water that flows per unit time to the gas cooler 30 becomes a flow rate according to the quantity of heat recovered by the first medium-pressure coal economizer 70a, the second medium-pressure coal economizer 70b, and the gas cooler 30.

Meanwhile, in Step S303 of FIG. 3, since the gasifier 20 is not generating the combustible gas, the control unit CU switches fuel to be supplied to the gas turbine equipment 50, to the auxiliary fuel that the auxiliary fuel supply unit 60 supplies from the combustible gas generated by the gasifier 20. When the control unit CU transmits a control signal to the auxiliary fuel supply unit 60, the auxiliary fuel is supplied from the auxiliary fuel supply unit 60 to the gas turbine equipment 50.

In Step S304 (second heat exchange step), the control unit CU controls the opened/closed state of the switching valves 100e, 100f, 100g, 100h, and 100i and the regulating valve 100d so as to form separate heat exchange lines (a first heat exchange line and a second heat exchange line) with the first medium-pressure coal economizer 70a, the second medium-pressure coal economizer 70b, and the gas cooler 30, respectively.

The control unit CU performs control so as to bring the switching valve 100f into a closed state (a black valve in FIG. 2) and to bring the switching valves 100e, 100g, 100h, and 100i into an open state (white valves in FIG. 2). In addition, as will be described below, the opened/closed state of the regulating valve 100d is suitably adjusted according to the amount of steam separated by the steam separator 100k.

Here, the separate heat exchange lines formed by the operation of Step S304 will be described with reference to FIG. 2.

One of the separate heat exchange lines formed by the operation of Step S304 is the first heat exchange line that allows the cooling water to be circulated through the first medium-pressure coal economizer 70a. The other of the separate heat exchange lines is the second heat exchange line that allows the cooling water to be circulated through the second medium-pressure coal economizer 70b. The first heat exchange line and the second heat exchange line are heat exchange lines that allows the cooling water to be independently and respectively circulated.

First, the first heat exchange line that allows the cooling water to be circulated through the first medium-pressure coal economizer 70a will be described.

The first heat exchange line guides the cooling water to be pumped by the circulation pump 100c to the first medium-pressure coal economizer 70a via the switching valve 100h. After the cooling water guided to the first medium-pressure coal economizer 70a is heated by the heat exchange with the flue gas, the cooling water is guided to the steam separator 100k via the switching valve 100g. The cooling water decompressed by the switching valve 100g is guided to the steam separator 100k as a cooling medium in a state where water and steam are mixed together. The steam separator 100k separates steam from the cooling medium guided from the switching valve 100g, and supplies the steam to the low-pressure steam turbine 80c via the switching valve 100i.

Meanwhile, the steam separator 100k separates drain water from the cooling medium guided from the switching valve 100g, and supplies the separated drain water to the circulation pump 100c. The circulation pump 100c guides the drain water (cooling water) separated by the steam separator 100k again to the first medium-pressure coal economizer 70a via the switching valve 100h. In this way, the cooling water is circulated through the first heat exchange line constituted with the circulation pump 100c, the switching valve 100h, the first medium-pressure coal economizer 70a, the switching valve 100g, and the steam separator 100k.

Here, the steam separated by the steam separator 100k is guided to the low-pressure steam turbine 80c outside the first heat exchange line. Therefore, the flow rate of the cooling water that flows through the first heat exchange line will decrease by an amount according to the amount of the separated steam. Thus, in the present embodiment, the control unit CU regulates the opening degree of the regulating valve 100d so as to cause the cooling water according to the amount of the steam separated by the steam separator 100k to flow into the first heat exchange line from the second heat exchange line.

The control unit CU regulates the opening degree of the regulating valve 100d such that a liquid level sensor of the steam separator 100k indicates a constant liquid level height. The control unit CU increases the opening degree of the regulating valve 100d to cause the cooling water to flow into the first heat exchange line from the second heat exchange line, in a case where the liquid level height to be detected by liquid level sensor becomes lower than a target height. Additionally, the control unit CU brings the opening degree of the regulating valve 100d into a closed state to keep the cooling water from flowing into the first heat exchange line from the second heat exchange line, in a case where the liquid level height to be detected by liquid level sensor becomes higher than the target height.

Next, the second heat exchange line that allows the cooling water to be circulated through the second medium-pressure coal economizer 70b will be described.

In FIG. 2, the cooling water to be pumped by the medium-pressure water supply pump 100a is guided to the second medium-pressure coal economizer 70b via the switching valve 100e. After the cooling water guided to the second medium-pressure coal economizer 70b is heated by the heat exchange with the flue gas, a portion thereof is guided to the high-pressure water supply pump 100b and another portion thereof is guided to the medium-pressure evaporator 70c. The cooling water guided to the medium-pressure evaporator 70c is heated by the heat exchange with the flue gas, is turned into the steam, and is guided to the medium-pressure steam turbine 80b.

All of the cooling water guided to the high-pressure water supply pump 100b is guided to the high-pressure evaporator 70d. The cooling water guided to the high-pressure evaporator 70d is heated by the heat exchange with the flue gas, is turned into the steam, and is guided to the high-pressure steam turbine 80a.

The steam guided to the high-pressure steam turbine 80a is used as the rotational driving power of the high-pressure steam turbine 80*a*. After the steam that has worked in the high-pressure steam turbine 80*a* and has fallen in temperature is reheated within the heat recovery steam generator 70, the steam is guided to the medium-pressure steam turbine 80*b*, and is used as rotational driving power in the medium-pressure steam turbine 80*b*.

In this way, in a case where the separate heat exchange line consisting of the first heat exchange line and the second heat exchange line is formed by the operation of Step S304, the cooling water is independently circulated in the respective heat exchange lines. Particularly, in the first heat exchange line, the cooling water not to be separated as steam in the steam separator 100*k* is circulated through the first medium-pressure coal economizer 70*a* and to perform heat exchange. Therefore, the flow rate of the cooling water that is circulated through the first medium-pressure coal economizer 70*a* per unit time is increased, and the recovery efficiency of heat from the flue gas can be enhanced.

As described above, by executing the operation illustrated in the flowchart of FIG. 3, the control unit CU can form either a serial circulation line or separate circulation lines as a heat exchange line for cooling water according to whether or not generation of the combustible gas by the gasifier 20 is performed, and can maintain the recovery efficiency of heat of the heat recovery steam generator 70.

Here, an integrated coal gasification combined cycle 1' of Comparative Example of the present embodiment will be described with reference to FIGS. 4 and 5.

In the integrated coal gasification combined cycle 1 of the present embodiment, the heat recovery steam generator 70 includes the first medium-pressure coal economizer 70*a* and the second medium-pressure coal economizer 70*b*.

In contrast, in the integrated coal gasification combined cycle 1' of Comparative Example, the heat recovery steam generator 70' includes a single medium pressure coal economizer 70*e*.

Figure 4:
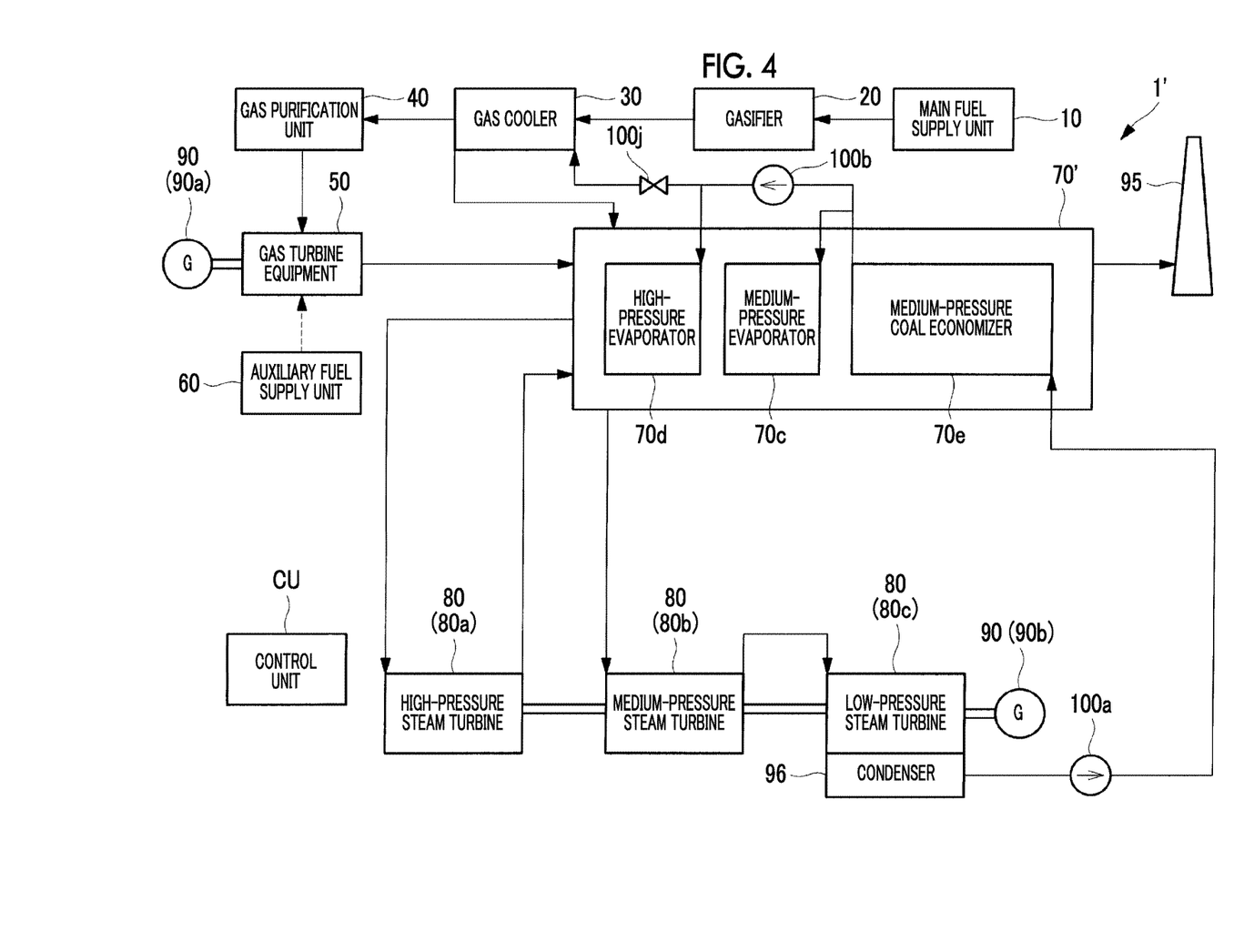
FIG. 4 is a system diagram illustrating the integrated coal gasification combined cycle of a comparative embodiment, and is a view illustrating a state where a combustible gas generated by a gasifier is combusted.
Figure 5:
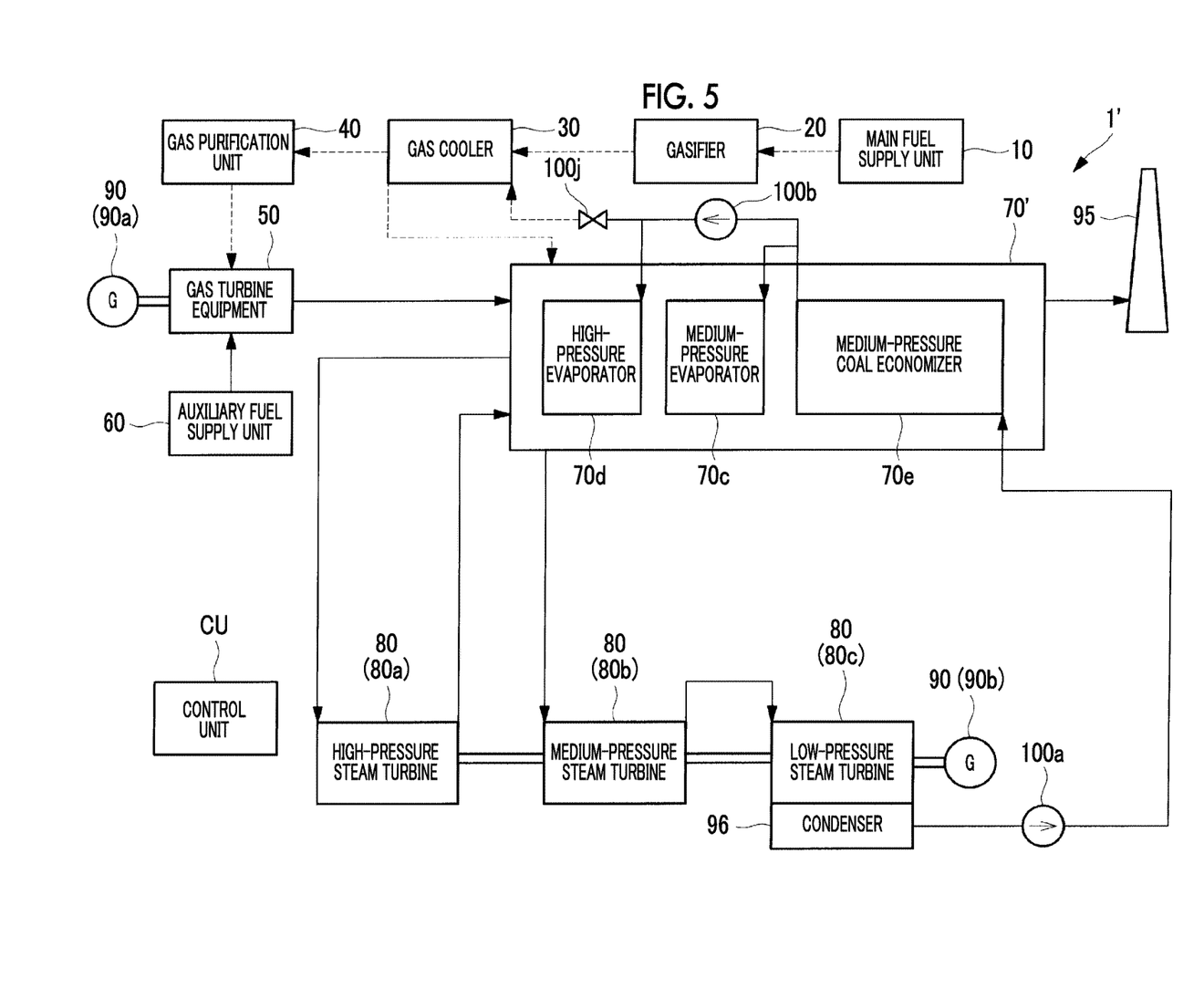
FIG. 5 is a system diagram illustrating the integrated coal gasification combined cycle of the comparative embodiment, and is a view illustrating a state where an auxiliary fuel is combusted.

In addition, in FIGS. 4 and 5, since components to which the same reference signs as FIGS. 1 and 2 are given are the same as those of FIGS. 1 and 2, the description thereof will be omitted.

As illustrated in FIG. 4, in a case where the gasifier 20 generates combustible gas and the gas turbine equipment 50 combusts the combustible gas, a portion of the cooling water guided to the high-pressure water supply pump 100*b* is guided to the gas cooler 30 via the switching valve 100*j*, and another portion thereof is guided to the high-pressure evaporator 70*d*.

In a state illustrated in FIG. 4, steam is generated by heat exchange between the combustible gas and cooling water at the gas cooler 30. Therefore, the cooling water continuously flows into the gas cooler 30 with a sufficient amount of water supply via the high-pressure water supply pump 100*b*. Hence, the amount of water supply of the cooling water that flows through the medium pressure coal economizer 70*e*, the medium-pressure evaporator 70*c*, and the high-pressure evaporator 70*d* becomes sufficient amount, and the recovery efficiency of heat by the heat recovery steam generator 70' is maintained in a high state.

Meanwhile, as illustrated in FIG. 5, in a case where the gas turbine equipment 50 combusts the auxiliary fuel, the cooling water guided to the high-pressure water supply pump 100*b*, all of the cooling water is guided to the high-pressure evaporator 70*d*. In this case, the cooling water guided to the high-pressure water supply pump 100*b* is not guided to the gas cooler 30 via the switching valve 100*j*. This is because heat exchange between the combustible gas and the cooling water is not performed in the gas cooler 30 and steam is not generated. Therefore, the cooling water hardly flows into the gas cooler 30 via the high-pressure water supply pump 100*b*. Hence, the amount of water supply of the cooling water that flows through the medium pressure coal economizer 70*e*, the medium-pressure evaporator 70*c*, and the high-pressure evaporator 70*d* does not become sufficient amount, and the recovery efficiency of heat by the heat recovery steam generator 70' is brought into a low state.

In this way, in the integrated coal gasification combined cycle 1' of Comparative Example, in a case where the gas turbine equipment 50 combusts the auxiliary fuel, the cooling water hardly flow into the gas cooler 30, and accordingly, the recovery efficiency of heat by the heat recovery steam generator 70' is brought into a low state.

For example, in the integrated coal gasification combined cycle 1' of Comparative Example, in a case where the temperature of the exhaust gas discharged from the heat recovery steam generator 70' in a case where the gas turbine equipment 50 combusts the combustible gas is about 120° C. and in a case where the gas turbine equipment 50 combusts the auxiliary fuel, the temperature of the exhaust gas discharged from the heat recovery steam generator 70' reaches about 200° C.

Meanwhile, in the integrated coal gasification combined cycle 1 of the present embodiment, the separate heat exchange lines consisting of the first heat exchange line and the second heat exchange line are formed even in a case where the gas turbine equipment 50 combusts the auxiliary fuel. Therefore, the recovery efficiency of heat by the heat recovery steam generator 70 is maintained in a high state.

For example, in the integrated coal gasification combined cycle 1 of the present embodiment, in a case where the temperature of the exhaust gas discharged from the heat recovery steam generator 70 in a case where the gas turbine equipment 50 combusts the combustible gas is about 120° C. and in a case where the gas turbine equipment 50 combusts the auxiliary fuel, the temperature of the exhaust gas discharged from the heat recovery steam generator 70 also reaches about 120° C.

In addition, in the integrated coal gasification combined cycle 1 of the present embodiment, it is desirable that a predetermined flue gas temperature range of the exhaust gas discharged from the heat recovery steam generator 70 reaches about 120° C. The predetermined flue gas temperature range may be, for example, a range of 110° C. or higher to 130° C. or lower. A range of 115° C. or higher to 125° C. or lower is more preferable.

In this way, in a case where the gas turbine equipment 50 combusts the auxiliary fuel, if the integrated coal gasification combined cycle 1 of the present embodiment is contrasted with the integrated coal gasification combined cycle 1' of Comparative Example, the heat recovery efficiency in the present embodiment becomes higher than that of Comparative Example. In the integrated coal gasification combined cycle 1 of the present embodiment, the quantity of heat recovered by the first medium-pressure coal economizer 70*a* in a case where the gas turbine equipment 50 combusts the auxiliary fuel is supplied to the low-pressure steam turbine 80*c* as the steam separated by the steam separator 100*k*.

As an example, in a case where the ratio of the mass flow rate of the steam to the mass flow rate of the cooling water (drain water) separated by the steam separator 100*k* is made to reach about 10%, the power generation efficiency of the integrated coal gasification combined cycle 1 of the present embodiment when the gas turbine equipment 50 combusts the auxiliary fuel becomes about 2% higher than the power generation efficiency of the integrated coal gasification combined cycle 1' of Comparative Example.

Next, the functions and the effects exhibited by the integrated coal gasification combined cycle 1 of the present embodiment will be described.

In the integrated coal gasification combined cycle 1 of the present embodiment, in a case where the combustible gas is generated by the gasifier 20, the combustible gas cooled by the gas cooler 30 is combusted by the gas turbine equipment 50, is turned into the flue gas, and is guided to the heat recovery steam generator 70. In this case, the first medium-pressure coal economizer 70a (first heat exchanger) and the second medium-pressure coal economizer 70b (second heat exchanger) of the heat recovery steam generator 70 recover heat from the flue gas, and the gas cooler 30 recovers heat from the combustible gas. In this case, since the serial heat exchange line is formed by the first medium-pressure coal economizer 70a, the second medium-pressure coal economizer 70b, and the gas cooler 30, the cooling water with a flow rate according to the quantity of heat recovered by the first medium-pressure coal economizer 70a, the second medium-pressure coal economizer 70b, and the gas cooler 30 flows through the circulation line unit 100 per unit time.

Meanwhile, in a case where the combustible gas is not generated by the gasifier 20, the auxiliary fuel is supplied from the auxiliary fuel supply unit (gas supply unit) 60 to the gas turbine equipment 50, is turned into the flue gas, and is guided to the heat recovery steam generator 70. In this case, while the first medium-pressure coal economizer 70a and the second medium-pressure coal economizer 70b of the heat recovery steam generator 70 recover heat from the flue gas, the heat recovery using the gas cooler 30 is not performed. In this case, the separate heat exchange lines are formed by the first medium-pressure coal economizer 70a and the second medium-pressure coal economizer 70b, respectively. Therefore, the flow rate of the cooling water that flows through the circulation line unit 100 per unit time becomes a flow rate obtained by adding the flow rate of the cooling water flowing through the first heat exchange line forming the first medium-pressure coal economizer 70a per unit time, and the flow rate of the cooling water flowing through the second heat exchange line forming the second medium-pressure coal economizer 70b per unit time to each other.

Therefore, the flow rate of the cooling water that flows through the circulation line unit 100 per unit time increases, compared to a case where the serial heat exchange line is formed by the first medium-pressure coal economizer 70a and the second medium-pressure coal economizer 70b. Accordingly, the recovery efficiency of heat from the flue gas by the heat recovery steam generator 70 can be increased compared with the case where the serial heat exchange line is formed.

Consequently, even in a case where the auxiliary fuel that becomes an alternative of the combustible gas generated by the gasifier 20 is combusted in the gas turbine equipment 50 to generate the flue gas, the integrated coal gasification combined cycle 1 that can maintain the recovery efficiency of heat from the flue gas by the heat recovery steam generator 70 can be provided.

Additionally, according to the integrated coal gasification combined cycle 1 of the present embodiment, the steam separator 100k of the first heat exchange line formed by the circulation line unit 100 in a case where the gas turbine equipment 50 combusts the auxiliary fuel separates steam from the cooling water subjected to heat exchange by the first medium-pressure coal economizer 70a, and is supplied to the steam turbine equipment 80. Then, the inflow rate of the cooling water from the second heat exchange line to the first heat exchange line is regulated by the regulating valve 100d according to the amount of supply of the steam from the steam separator 100k to the steam turbine equipment 80. Therefore, the flow rate of the cooling water that flows through the first heat exchange line is appropriately maintained.

Other Embodiments

In the above description, an example in which the gasifier 20 that gasifies the pulverized coal (pulverized coal) is used as the equipment for generating the combustible gas has been illustrated. However, other aspects may be adopted.

For example, gasifier equipment that gasifies other carbonaceous feedstocks, such as biomass fuels, such as thinned wood, waste wood, driftwood, grass, waste, sludge, and tires, may be used as the equipment for generating the combustible gas.

In the above description, the gas turbine equipment 50 and the steam turbine equipment 80 respectively apply driving forces to the generators 90a and 90b provided for exclusive use. However, other aspects may be adopted. For example, an aspect in which the gas turbine equipment 50 and the steam turbine equipment 80 apply a driving force to the single generator 90 may be adopted.

REFERENCE SIGNS LIST

1, 1': INTEGRATED COAL GASIFICATION COMBINED CYCLE (INTEGRATED GASIFICATION COMBINED CYCLE)
10: MAIN FUEL SUPPLY UNIT
20: GASIFIER
30: GAS COOLER
40: GAS PURIFICATION UNIT
50: GAS TURBINE EQUIPMENT
60: AUXILIARY FUEL SUPPLY UNIT (GAS SUPPLY UNIT)
70, 70': HEAT RECOVERY STEAM GENERATOR
70a: FIRST MEDIUM-PRESSURE COAL ECONOMIZER (FIRST HEAT EXCHANGER)
70b: SECOND MEDIUM-PRESSURE COAL ECONOMIZER (SECOND HEAT EXCHANGER)
70c: MEDIUM-PRESSURE EVAPORATOR
70d: HIGH-PRESSURE EVAPORATOR
80: STEAM TURBINE EQUIPMENT
90: GENERATOR
100: CIRCULATION LINE UNIT
100k: STEAM SEPARATOR
CU CONTROL UNIT

The invention claimed is:

1. An integrated gasification combined cycle comprising:
   a gasifier that performs a gasification reaction of a carbonaceous feedstock using an oxygen-containing gas, and generates a combustible gas;
   a gas cooler that generates steam from cooling water by heat exchange between the combustible gas generated by the gasifier, and the cooling water;
   gas turbine equipment that combusts the combustible gas cooled by the gas cooler or an auxiliary fuel supplied from an auxiliary fuel supply unit, and obtains rotational driving power;
   a heat recovery steam generator that recovers the quantity of heat of flue gas discharged from the gas turbine equipment, and generates steam;

steam turbine equipment that obtains rotational driving power with the steam supplied from the heat recovery steam generator;

a generator that is driven by the rotational driving power supplied by the gas turbine equipment and the steam turbine equipment; and a circulation line unit that performs heat exchange of the cooling water in the heat recovery steam generator, wherein the heat recovery steam generator includes a first heat exchanger and a second heat exchanger that perform heat exchange between the flue gas and the cooling water, wherein the circulation line unit forms a serial heat exchange line in which the cooling water serially passes through the first heat exchanger, the second heat exchanger, and the gas cooler upon a condition where the gas turbine equipment combusts the combustible gas, and forms a first heat exchange line in which the cooling water does not pass through the gas cooler but passes through the first heat exchanger and a second heat exchange line in which the cooling water does not pass through the gas cooler but passes through the second heat exchanger, respectively, upon a condition where the gas turbine equipment combusts the auxiliary fuel, wherein the flue gas is discharged in a predetermined flue gas temperature range from the heat recovery steam generator, and wherein the circulation line unit includes a regulating valve that regulates the inflow rate of the cooling water from the second heat exchange line to the first heat exchange line according to the amount of supply of the steam from a steam separator to the steam turbine equipment.

2. The integrated gasification combined cycle according to claim 1, wherein the separate heat exchange lines formed upon a condition where the gas turbine equipment combusts the auxiliary fuel include a first heat exchange line allows the cooling water to be circulated through the first heat exchanger, and a second heat exchange line that allows the cooling water to be circulated through the second heat exchanger, and wherein the first heat exchange line includes the steam separator to which the cooling water subjected to heat exchange by the first heat exchanger is guided and which supplies the steam separated from the cooling water to the steam turbine equipment.

3. A method for operating an integrated gasification combined cycle, the integrated gasification combined cycle including:

a gasifier that performs a gasification reaction of a carbonaceous feedstock using an oxygen-containing gas, and generates a combustible gas;

a gas cooler that generates steam from cooling water by heat exchange between the combustible gas generated by the gasifier, and the cooling water;

gas turbine equipment that combusts the combustible gas cooled by the gas cooler or an auxiliary fuel supplied from an auxiliary fuel supply unit, and obtains rotational driving power;

a heat recovery steam generator that recovers the quantity of heat of the flue gas discharged from the gas turbine equipment, and generates steam;

steam turbine equipment that obtains rotational driving power with the steam supplied from the heat recovery steam generator; and a generator that is driven by the rotational driving power supplied by the gas turbine equipment and the steam turbine equipment, wherein the heat recovery steam generator includes a first heat exchanger that performs heat exchange between the flue gas and the cooling water, and a second heat exchanger that performs heat exchange between the flue gas and the cooling water, the method comprising:

a step of performing switching regarding whether the cooling water passes through any of the first heat exchanger, the second heat exchanger, and the gas cooler, according to a condition where the gas turbine equipment combusts the combustible gas and a condition where the gas turbine equipment combusts the auxiliary fuel, wherein the step of performing switching comprises forming a serial heat exchange line in which the cooling water serially passes through the first heat exchanger, the second heat exchanger, and the gas cooler upon a condition where the gas turbine equipment combusts the combustible gas, and forming a first heat exchange line in which the cooling water does not pass through the gas cooler but passes through the first heat exchanger and a second heat exchange line in which the cooling water does not pass through the gas cooler but passes through the second heat exchanger, respectively, upon a condition where the gas turbine equipment combusts the auxiliary fuel, wherein the flue gas is discharged in a predetermined flue gas temperature range from the heat recovery steam generator, and wherein the method further comprises a regulating step of regulating the inflow rate of the cooling water from the second heat exchange line to the first heat exchange line according to the amount of supply of the steam from a steam separator to the steam turbine equipment.

4. The method for operating an integrated gasification combined cycle according to claim 3, wherein the separate heat exchange lines include a first heat exchange line allows the cooling water to be circulated through the first heat exchanger, and a second heat exchange line that allows the cooling water to be circulated through the second heat exchanger, and wherein the first heat exchange line includes the steam separator to which the cooling water subjected to heat exchange by the first heat exchanger is guided and which supplies the steam separated from the cooling water to the steam turbine equipment.

* * * * *